Dec. 27, 1949  A. BOUWERS  2,492,461
CORRECTED SCHMIDT TYPE OPTICAL SYSTEM
Filed Dec. 18, 1945

INVENTOR:
ALBERT BOUWERS
BY *E. F. Wenderoth*
ATTORNEY

Patented Dec. 27, 1949

2,492,461

UNITED STATES PATENT OFFICE 2,492,461

CORRECTED SCHMIDT TYPE OPTICAL SYSTEM

Albert Bouwers, Delft, Netherlands, assignor to N. V. Optische Industrie "De Oude Delft," Delft, Netherlands Application December 18, 1945, Serial No. 635,683
In the Netherlands July 7, 1941

Section 1, Public Law 690, August 8, 1946
Patent expires July 7, 1961

17 Claims. (Cl. 88—57)

In the course of time various mirror systems for the optical formation of images have come to be known. A great advantage of the use of mirrors is that they are free from chromatic aberrations.

The simplest form of a mirror system is the spherical mirror which generally has spherical aberration by which the mirror is rendered unserviceable even with small relative apertures.

With a parabolical mirror the spherical aberration is exactly obviated, as a result of which the relative aperture can theoretically be given an optional value. Practically, however, one is greatly limited in this respect, because the parabolisation technique becomes more difficult as the relative aperture of the mirror increases. In addition to this drawback the parabolical mirror has the serious drawback of involving coma due to which the field is reduced to a few degrees at the utmost.

Schmidt has succeeded in making a considerable progress by locating in the center of curvature of a spherical mirror a correcting element by which spherical aberration and astigmatism of the image is avoided. In this way Schmidt succeeded in attaining a field of about 19° with a relative aperture of about 1:1.4. The introduction of the correcting element involves chromatic aberration which, however, is small and can be rendered ineffective by means of a method devised by Schmidt himself. One drawback of the Schmidt system consists in the technical difficulty of making the correcting element, whose surface has a curve of the fourth degree as a meridian section. Moreover, the size of the field is not sufficient for many purposes.

The present invention relates to an optical system comprising a spherical mirror and a correcting element. According to the recognition on which the invention is based we have succeeded by simple optical means to obtain an optical system, by means of which a sharp image of a large field can be formed with a high luminous intensity. In fact, we have found that this can be ensured by providing a suitable correcting element having spherical limiting planes at a suitable distance from the spherical mirror forming part of an optical system.

One form of construction of the optical system according to the invention in which the correcting element is curved similarly to the mirror and located between the center of curvature of the mirror and the mirror and is traversed only once by the rays partaking in forming the image exhibits the feature that the correcting element has spherical limiting surfaces and the character of a weak negative meniscus lens. It is advisable that the correcting element should be closer to the focal point of the mirror than to the mirror and the center of curvature of the mirror.

Another form of construction of the optical system according to the invention exhibits the feature that the correcting element has spherical limiting surfaces and the character of a weak negative meniscus lens which is curved in a manner opposite to that of the mirror, which element is located at a distance from the mirror which is larger than the radius of curvature of this mirror and preferably smaller than three times the radius of curvature. It has been found that it is advantageous for the state of correction of the last-mentioned optical system according to the invention to choose the distance between the mirror and the correcting element larger than 1.25 times the radius of curvature of the mirror. In this case it is simpler to achieve correction for a larger field.

In the first-mentioned form of construction of the optical system according to the invention it is advantageous to locate the diaphragm at the side of the correcting element remote from the mirror. In this way a suitable positioning is obtained in connection with the correction of the coma and the astigmatism. For the same reason, in the second form of construction of the optical system according to the invention the diaphragm is preferably located between the correcting element and the mirror.

As has already been stated the correcting element forming part of the optical system according to the invention has the character of a weak negative meniscus lens. Thus, for instance, the correcting element may consist either of a single weak negative lens or by a plurality of lenses in such manner that the total strength of the correcting element is small and negative, the two outer surfaces of the correcting element being curved in the same manner.

In a suitable form of construction of the optical system according to the invention the center of curvature of at least one of the surfaces of the correcting element is at the utmost a distance of ¼ of the radius of curvature of the mirror from its center of curvature and is preferably located substantially at the center of curvature of the mirror. In this way correction for larger fields can be obtained. When choosing the centers of curvature of two surfaces of the correcting element in such a manner that they are at the utmost at a distance of ¼ of the radius of curvature of the mirror therefrom and preferably located in the center of curvature of the mirror the field can be still further increased. When locating, moreover, the diaphragm in or near the center of curvature of the mirror one obtains an extremely suitable form of construction of the optical systems according to the invention. In fact, the field has an unlimited size in this case, since the coma and the astigmatism of the system have been completely removed.

For several uses it may be desirable to obviate the small colour error inherent to the correcting element of the optical system according to the invention.

To this end the correcting element itself may be achromatised, for instance by constructing it as a cemented doublet both components of which consist of kinds of glass having the same refraction index for the average wavelength of the transmitted light.

Another method of securing chromatic correction consists in adding to the optical system a weak positive lens which is not bent through or only to a small extent.

According to the invention it is advisable to place a positive lens between the correcting element and the mirror, preferably in or near the center of curvature of the mirror. According to the invention it may be advantageous in some cases to choose the strength of the correcting element and the positive lens as well as their relative distance in such manner that the correcting element and the positive lens have a positive strength.

In the first form of construction of the optical system according to the invention it may occur that the distance from the projection surface to the mirror is larger than the distance between the mirror and the correcting element. In this case, according to the invention use may be made of a correcting element having a central aperture, as illustrated hereinafter by Example VI. If the said distance corresponds to the distance from the projection surface to the correcting element then, according to the invention, the radius of curvature of the surface of the correcting element facing the mirror may be made equal to the radius of curvature of the projection surface, as illustrated hereinafter by Example V. In order to counteract damaging of the reflecting surface of the mirror the surface-mirror may be replaced by a mirror provided at the back with a reflecting layer, at least if the glass layer located in the path of the light rays is thin.

The invention will be more fully explained by reference to the accompanying drawing, in which Fig. 1 is a schematic cross-sectional view of one embodiment of the invention;

In the following examples of forms of construction of the optical system according to the invention the resolving power amounts to 0.02% of the focal distance. The refracting or reflecting surfaces are numbered 1, 2, and so on. The radia of curvature are represented by $\gamma$. A positive sign signifies that the surface in question turns its convex side to the direction of the incident light a negative sign signifying that it turns its convex side to this direction.

All measures have been stated in mms.

The refractive index for sodium light of the glass of all lenses in these three examples is 1.52.

In the figures D represents the diaphragm, C the correcting element, S the mirror, M the center of curvature of the mirror and F the film support. The light enters from the left.

Figure 1:
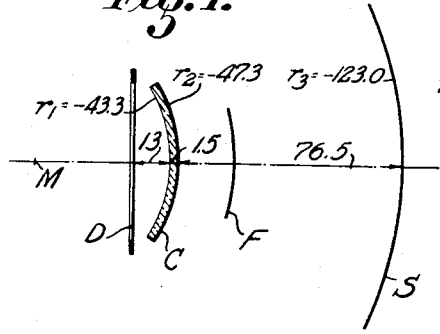

Example I (Fig. 1)

[Relative aperture 1: 1.2; field 20°]

| Diaphragm | Distances |
|---|---|
| $r_1 - 43,3$ | 13 |
| $R_2 - 47,3$ | 1.5 |
| $r_3 - 123,0$ | 76.5 |

In this example one obtains the advantage of a small length of the camera with respect to the Schmidt camera.

Figure 2:
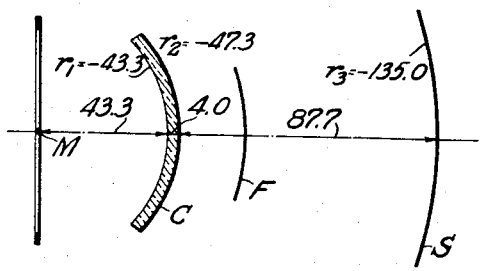
Fig. 2 is a schematic cross-sectional view of another embodiment of the invention in which the diaphragm is located at the center of curvature of the mirror and the miniscus correcting element is closer to the focal surface than to the center of curvature of the mirror.
Figure 5:
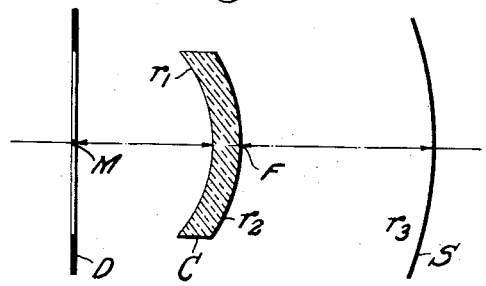
Fig. 5 is a schematic cross-sectional view of an embodiment in which a single element serves as the spherical-aberration correcting element for an image receiving element.

Example II (Fig. 2)

[Relative aperture 1: 1.2; field unlimited]

| Diaphragm | Distances |
|---|---|
| $r_1 - 43,3$ | 43.3 |
| $r_2 - 47,3$ | 4.0 |
| $r_3 - 135,0$ | 87.7 |

The relative aperture may be increased to 1:0.95 if a resolving power of 0.04% of the focal distance is enough.

Figure 3:
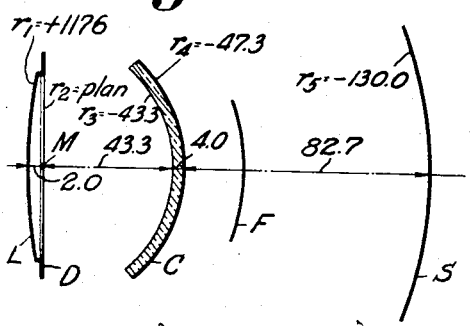
Fig. 3 is a schematic cross-sectional view of another embodiment of the invention wherein a plano-convex positive lens is placed at the center of curvature of the mirror.
Figure 6:
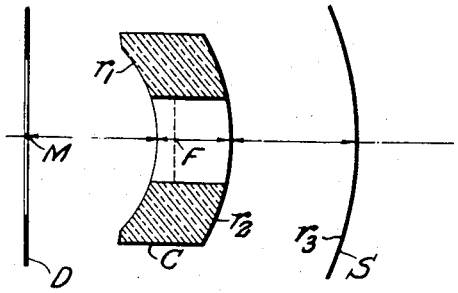
Fig. 6 illustrates an embodiment in which the spherical-aberration correcting element may have a central aperture.

Example III (Fig. 3)

[Relative aperture 1:1,1; field ±40°]

| Diaphragm | Distances |
|---|---|
| $r_1 + 1176$ | 0 |
| $r_2$ plan | 2.0 |
| $r_3 - 43,3$ | 43,3 |
| $r_4 - 47,3$ | 4.0 |
| $r_5 - 130,0$ | 82.7 |

Figure 4:
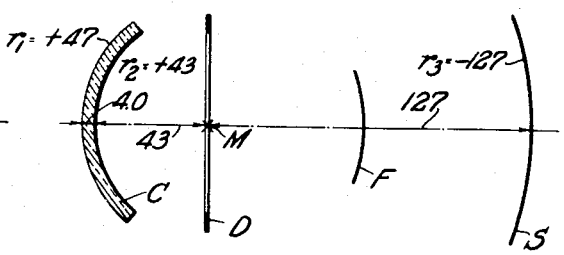
Fig. 4 is a schematic cross-sectional view in which the meniscus correcting element is located farther distant from the spherical mirror than the center of curvature thereof.

Example IV (Fig. 4)

[Relative aperture 1:0.9; field unlimited]

|  | Distances |
|---|---|
| $r_1+47$ | 4 |
| $r_2+43$ | 43 |
| diaphragm | 127 |
| $r_3-127$ | |

What I claim is:

1. An optical system comprising a concave spherical mirror, and a refractive spherical-aberration correcting meniscus element substantially correcting by refraction the spherical aberration introduced in the optical system by said mirror, said element being positioned to be traversed only once by light rays entering the system and said element having substantially spherical refractive surfaces, one of said surfaces having its center of curvature substantially coincident with the center of curvature of said mirror.

2. An optical system comprising a concave spherical mirror, and a refractive spherical-aberration correcting meniscus element substantially correcting by refraction the spherical aberration introduced in the optical system by said mirror, said element being positioned to be traversed only once by light rays entering the system and said element having substantially spherical refractive surfaces, said surfaces having their centers of curvature substantially coincident with the center of curvature of said mirror.

3. An optical system comprising a concave spherical mirror, and a refractive spherical-aberration correcting meniscus element concave in the same sense as said mirror and positioned between said mirror and the center of curvature of said mirror to be traversed only once by light rays coincident on the system, said element substantially correcting by refraction the spherical aberration introduced in the optical system by said mirror, each refractive surface of said correcting element being spherical.

4. An optical system comprising a concave spherical mirror and a refractive spherical-aberration correcting meniscus element concave in the same sense as said mirror and substantially correcting by refraction the spherical aberration introduced in the optical system by said mirror, said element being positioned between said mirror and the center of curvature of said mirror to be traversed only once by light rays incident on the system and having spherical refractive surfaces, said surfaces having their centers of curvature not farther distant from the center of curvature of said mirror than one-fourth the radius of curvature of said mirror.

5. An optical system comprising a concave spherical mirror, and a refractive spherical-aberration correcting meniscus element concave in the same sense as said mirror and substantially correcting by refraction the spherical aberration introduced in the optical system by said mirror, said element being positioned between said mirror and the center of curvature of said mirror to be traversed only once by light rays incident on the system and having spherical refractive surfaces, said surfaces having their centers of curvature substantially coincident with the center of curvature of said mirror.

6. An optical system comprising a concave spherical mirror having a radius of curvature $r$, and a refractive spherical-aberration correcting meniscus element substantially correcting by refraction the spherical aberration introduced in the optical system by said mirror, said element having the character of a weak negative meniscus lens concave in the same sense as said mirror and being positioned to be traversed only once by light rays incident on the system and being spaced a distance $d$ from said mirror, said distance $d$ substantially satisfying the following inequality:

$$\tfrac{1}{4}r < d < \tfrac{3}{4}r$$

said element having a spherical refractive surface, said surface having its center of curvature not greater distance from the center of curvature of said mirror than one-fourth $r$.

7. An optical system comprising a concave spherical mirror having a radius of curvature $r$, and a refractive spherical-aberration correcting meniscus element substantially correcting by refraction the spherical aberration introduced in the optical system by said mirror, said element having the character of a weak negative meniscus lens concave in the same sense as said mirror and being positioned to be traversed only once by light rays incident on the system and being spaced a distance $d$ from said mirror, said distance $d$ substantially satisfying the following inequality:

$$\tfrac{1}{4}r < d < \tfrac{3}{4}r$$

said element having spherical refractive surfaces, said surfaces having their centers of curvature substantially coincident with the center of curvature of said mirror.

8. An optical system comprising a concave spherical mirror, a refractive spherical-aberration correcting meniscus element concave in the same sense as said mirror substantially correcting by refraction the spherical aberration introduced in the optical system by said mirror, said element having the character of a weak negative meniscus lens, and positioned to be traversed only once by light rays incident on the system and interposed between said mirror and the center of curvature thereof, said element having spherical refractive surfaces the centers of curvature of which are substantially coincident with the center of curvature of said mirror, and a stop positioned farther distant from said mirror than said element.

9. An optical system comprising a concave spherical mirror, a refractive correcting element substantially correcting the spherical aberration introduced in said system by said mirror, said element being positioned to be traversed only once by light rays entering the system and having the character of a weak negative meniscus lens and having a spherical refractive surface, said surface having its center of curvature substantially coincident with the center of curvature of said mirror, and a weak positive lens at the center of curvature of said mirror.

10. An optical system comprising a concave spherical mirror, a refractive spherical-aberration correcting element concave in the same sense as said mirror and substantially correcting by refraction the spherical aberration introduced in the optical system by said mirror, said element having the character of a weak negative meniscus lens and interposed between said mirror and the center of curvature thereof to be traversed only once by light rays incident on the system and having spherical refractive surfaces, and a weak positive lens at the center of curvature of said mirror.

11. An optical system comprising a concave spherical mirror, a refractive spherical-aberration correcting meniscus element concave in the same sense as said mirror substantially correcting by refraction the spherical aberration introduced in the optical system by said mirror, said element having the character of a weak negative meniscus lens and interposed between said mirror and the center of curvature thereof to be traversed only once by light rays incident on the system, said element having spherical refractive surfaces the centers of curvature of which are substantially coincident with the center of curvature of said mirror, and a weak positive lens placed at the center of curvature of said mirror.

12. An optical system comprising a concave spherical mirror, and a refractive spherical-aberration correcting meniscus element substantially correcting by refraction the spherical aberration introduced in the optical system by said mirror, said element having the character of a weak negative meniscus lens concave in a sense opposite to the concavity of said mirror and being positioned to be traversed only once by light rays entering the system and being spaced farther distant from said mirror than the radius of curvature of said mirror.

13. An optical system comprising a concave spherical mirror having a radius of curvature $r$, and a refractive spherical-aberration correcting meniscus element substantially correcting by refraction the spherical aberration introduced in the optical system by said mirror, said element having the character of a weak negative meniscus lens concave in a sense opposite to the concavity of said mirror and being positioned to be traversed only once by light rays entering the system and being spaced a distance $d$ from said mirror to substantially satisfy the following inequality:

$$1\tfrac{1}{4}r < d < 3r,$$

said element having spherical refractive surfaces, the centers of curvature of which are less distant from the center of curvature of said mirror than $\tfrac{1}{4}r$.

14. An optical system comprising a concave spherical mirror, and a refractive spherical-aberration correcting element having the character of a weak negative meniscus lens concave in a sense opposite to the concavity of said mirror and substantially correcting by refraction the spherical aberration introduced in the optical system by said mirror, said element being positioned to be traversed only once by light rays entering the system and having spherical refractive surfaces, the centers of curvature of said surfaces being substantially coincident with the centers of curvature of said mirror.

15. An optical system comprising a concave spherical mirror, a refractive spherical-aberration correcting meniscus element substantially correcting by refraction the spherical aberration introduced in the optical system by said mirror, said element having the character of a weak negative meniscus lens concave in a sense opposite to the concavity of said mirror and being positioned to be traversed only once by light rays entering the system and being spaced farther distant from said mirror than the radius of curvature of said mirror, and a stop interposed between said element and said mirror.

16. An optical system comprising a concave spherical mirror, and a meniscus element comprising a zonal refractive spherical-aberration correction portion substantially correcting by refraction the spherical aberration introduced in the optical system by said mirror and a central image receiving portion, said element being concave in the same sense as said mirror and being positioned between said mirror and the center of curvature of said mirror with the image receiving portion of said element substantially coincident with the object surface of said system.

17. An optical system comprising a concave spherical mirror, and a refractive spherical-aberration correcting meniscus element substantially correcting by refraction the spherical aberration introduced in the optical system by said mirror, said element being concave in the same sense as said mirror and being positioned between said mirror and the center of curvature of said mirror to be traversed only once by light rays incident on the system, said element having a central aperture.

ALBERT BOUWERS.

REFERENCES CITED

The following references are of record in the file of this patent:

UNITED STATES PATENTS

| Number | Name | Date |
|---|---|---|
| 2,141,884 | Sonnefeld | Dec. 27, 1938 |
| 2,170,979 | Straubel | Aug. 29, 1939 |
| 2,350,112 | Houghton | May 30, 1944 |

FOREIGN PATENTS

| Number | Country | Date |
|---|---|---|
| 544,694 | Great Britain | Apr. 23, 1942 |
| 554,024 | Great Britain | June 16, 1943 |

OTHER REFERENCES

Journal Optical Society of America, vol. 34, No. 5, May 1944, pages 270 to 284. Article by Maksutov. Published by American Institute of Physics, 57 East 55th Street, New York, N. Y.